US005348800A

United States Patent [19]

Moro et al.

[11] Patent Number: 5,348,800

[45] Date of Patent: Sep. 20, 1994

[54] COMPOSITE SOFT MAGNETIC MATERIAL

[75] Inventors: Hideharu Moro; Yasuharu Miyauchi, both of Chiba, Japan

[73] Assignee: TDK Corporation, Tokyo, Japan

[21] Appl. No.: 13,210

[22] Filed: Feb. 1, 1993

Related U.S. Application Data

[63] Continuation of Ser. No. 828,102, Jan. 30, 1992, abandoned.

[30] Foreign Application Priority Data

Aug. 19, 1991 [JP] Japan .................................. 3-231019
Nov. 22, 1991 [JP] Japan .................................. 3-333899

[51] Int. Cl.[5] .......................... B32B 5/16; B22F 1/00; B22F 1/02; H01F 1/22

[52] U.S. Cl. ................................. 428/328; 252/62.58; 252/62.59; 419/35; 419/56; 419/57; 428/329; 428/331; 428/336; 428/404; 428/689; 428/900

[58] Field of Search ............... 428/328, 329, 331, 336, 428/689, 404, 900, 357; 252/62.58, 62.59; 419/35, 56, 57

[56] References Cited

U.S. PATENT DOCUMENTS 4,320,080 3/1982 Esper et al. ...................... 252/62.54

FOREIGN PATENT DOCUMENTS 0088992 9/1983 European Pat. Off. .
0401835 12/1990 .
0406580 1/1991 European Pat. Off. .
984544 7/1951 France .
53-91397 8/1978 Japan .
164753 9/1983 Japan .
58-164753 9/1983 Japan .
13705 1/1989 Japan .
64-13705 1/1989 Japan .

OTHER PUBLICATIONS

Patent Abstracts of Japan, vol. 11, No. 36 (E-477) (2483), Feb. 3, 1987, JP-61 204 906, Sep. 11, 1986.
Patent Abstracts of Japan, vol. 15, No. 429 (C-880), Oct. 31, 1991, JP-31 80 434, Aug. 6, 1991.

*Primary Examiner*—D. S. Nakarani
*Attorney, Agent, or Firm*—Oblon, Spivak, McClelland, Maier & Neustadt

[57] ABSTRACT

A composite soft magnetic material is produced from soft magnetic metal (e.g., Sendust) particles by coating the particles with a non-magnetic metal oxide (e.g., α-alumina) in a mechano-fusion manner, or heat treating the particles to form a diffusion layer of α-alumina thereon, coating the coated particles with a high resistance soft magnetic substance (e.g., ferrite), and sintering the double coated particles under pressure as by hot pressing or plasma activated sintering. It exhibits high saturation magnetic flux density, magnetic permeability, and electric resistivity. The non-magnetic metal oxide intervening between the soft magnetic metal and the high resistance soft magnetic substance is effective in reducing core loss.

16 Claims, 3 Drawing Sheets

COMPOSITE SOFT MAGNETIC MATERIAL

This application is a continuation of application Ser. No. 07/828,102, filed on Jan. 30, 1992, now abandoned.

CROSS-REFERENCE TO THE RELATED APPLICATION

This application is related to copending U.S. patent application Ser. No. 07/696,911 filed May 8, 1991 by Moro and Miyauchi, now U.S. Pat. No. 5,227,235, for "Composites soft magnetic material and coated particles therefor".

This invention relates to composite soft magnetic material for use as magnetic cores.

BACKGROUND OF THE INVENTION

Known soft magnetic materials for magnetic cores or the like include metal soft magnetic materials such as Sendust and Permalloy and metal oxide soft magnetic materials such as ferrite. The metal soft magnetic materials have a high saturation magnetic flux density and high magnetic permeability, but experience great eddy current losses in a high frequency band because of low electric resistivity. They are thus difficult to use in the high frequency band. On the other hand, the metal oxide soft magnetic materials provide less eddy current losses in the high frequency band because of their higher electric resistivity than the metal soft magnetic materials. However, the metal oxide soft magnetic materials are unsatisfactory in saturation magnetic flux density.

Under such circumstances, composite soft magnetic materials having high saturation magnetic flux density and magnetic permeability as well as high electric resistivity were proposed as the soft magnetic material which overcame the drawbacks of both the metal soft magnetic material and the metal oxide soft magnetic material. For example, Japanese Patent Application Kokai (JP-A) No. 91397/1978 discloses a high magnetic permeability material comprising a metal magnetic material having a coating of high magnetic permeability metal oxide formed on the surface; JP-A 164753/1983 discloses a composite magnetic material prepared by mixing an oxide magnetic material powder and a metal magnetic material powder composed of an Fe-Ni base alloy and molding the mixture; and JP-A 13705/1989 discloses a composite magnetic material having a saturation magnetic flux density Bs of 6.5 to 20 kG, comprising a soft magnetic metal magnetic powder having a mean particle size of 1 to 5 μm and a soft ferrite wherein the soft ferrite fills in between the metal magnetic powder particles so that the metal magnetic powder particles are independent from each other while the soft ferrite portion is continuous.

Prior art composite soft magnetic materials including the ones disclosed in the foregoing patent publications are fired by hot press sintering, vacuum sintering, and atmospheric pressure sintering processes like ambient sintering. The firing temperature generally ranges from about 900° to about 1200° C. and a firing time of one hour or longer is generally required. However, metal soft magnetic materials, when held for more than one hour at elevated temperatures, are oxidized by oxygen available from the metal oxide soft magnetic materials which are, in turn, reduced. The situation remains the same even when the materials are fired in a reducing atmosphere. Since the metal soft magnetic material and metal oxide soft magnetic material lose their own features, a composite soft magnetic material having high saturation magnetic flux density and magnetic permeability as well as high electric resistivity is no longer obtained.

The inventors proposed a composite soft magnetic material obtained by plasma activated sintering a mixture soft magnetic metal particles and a high resistance soft magnetic substance in U.S. patent application Ser. No. 07/696,911 filed May 8, 1991. More particularly, soft magnetic metal particles are coated with a high resistance soft magnetic substance and a mass of the coated particles is placed in a plasma. Then charged particles including gas ions and electrons generated by electric discharge impinge against the contact between the coated particles for cleaning the contact area. Charged particle bombardment, coupled with evaporation of the substance at the contact area, provides an intense bombardment pressure to the coated particle surface. The high resistance soft magnetic substance on particles is increased in internal energy or activated. Therefore, the sintering time is reduced, for example, sintering is completed within about 5 minutes. As a result, oxidation of soft magnetic metal particles and reduction of high resistance soft magnetic substance are avoided and there can be provided a composite soft magnetic material having a high saturation magnetic flux density, high magnetic permeability, and high electric resistivity. However, this material is still insufficient in power or core loss. There is a need for further improvement in this regard.

SUMMARY OF THE INVENTION

An object of the present invention is to provide a composite soft magnetic material having a high saturation magnetic flux density, high magnetic permeability, high electric resistivity, and minimal core loss.

According to the present invention, there is provided a composite soft magnetic material comprising soft magnetic metal particles, a layer of high resistance soft magnetic substance intervening between the particles, and a layer of non-magnetic metal oxide intervening between each soft magnetic metal particle and the high resistance soft magnetic substance layer. More particularly, soft magnetic metal particles are covered with a high resistance soft magnetic substance with a non-magnetic metal oxide intervening therebetween and then fired under pressure into a sintered body. In the sintered body, the high resistance soft magnetic substance shells are interconnected to bind the soft magnetic metal particles.

The composite soft magnetic material is obtained by sintering under pressure a mixture of soft magnetic metal particles and a high resistance soft magnetic substance with a non-magnetic metal oxide intervening therebetween. In one preferred embodiment, it is obtained by coating the soft magnetic metal particles with the non-magnetic metal oxide and further with the high resistance soft magnetic substance, and sintering the coated particles under pressure. The non-magnetic metal oxide coating is about 0.02 to 1 μm thick.

In another preferred embodiment, the composite material is obtained by heat treating the soft magnetic metal particles in an oxygen atmosphere, thereby forming a diffusion layer of non-magnetic metal oxide on the particle surface, coating the particles with the high resistance soft magnetic substance, and sintering the coated particles under pressure. In this regard, the soft magnetic metal particles should contain Al and/or Si, and the non-magnetic metal oxide is Al and/or Si oxide. The non-magnetic metal oxide diffusion layer is about 3 to 300 μm thick.

Preferably, the soft magnetic metal particles have a mean particle diameter of about 5 to 100 μm. The high resistance soft magnetic substance coating is about 0.02 to 10 μm thick. Also preferably, the coating step is carried out by a mechano-fusion process including applying mechanical energy to the particles. The sintering step is hot press sintering or plasma activated sintering.

In a further preferred embodiment, the sintering under pressure is followed by heat treatment or annealing in an oxygen atmosphere.

The composite soft magnetic material according to the present invention is defined as comprising soft magnetic metal particles, a layer of high resistance soft magnetic substance (typically ferrite) intervening between the particles, and a layer of non-magnetic metal oxide intervening between each soft magnetic metal particle and the high resistance soft magnetic substance layer. We have discovered that if one intends to produce such a composite soft magnetic material by hot press sintering a mixture of soft magnetic metal particles and a high resistance soft magnetic substance, a certain type of reaction takes place between the soft magnetic metal and the high resistance soft magnetic substance. When soft magnetic metal particles containing Al and/or Si are used, for example, this reaction induces $Al_2O_3$ and/or $SiO_2$, which would lead to deteriorated properties including a lowering of magnetic permeability and an increase of core loss. Plasma activated sintering instead of hot press sintering would somewhat control such reaction, but fails to completely restrain the reaction, yet resulting in some losses. The inventors first discovered that such reaction products can adversely affect the properties of composite soft magnetic material.

Then, in order to restrain the above-mentioned type of reaction, a composite soft magnetic material is produced according to the present invention by previously coating soft magnetic metal particles with a non-magnetic metal oxide or by previously heat treating soft magnetic metal particles, if the particles contain Al and/or Si, to thereby form a diffusion layer of non-magnetic metal oxide such as $Al_2O_3$ on the particle surface, and thereafter, sintering a mixture of the soft magnetic metal particles having nonmagnetic metal oxide coated or formed on the surface thereof and a high resistance soft magnetic substance (e.g., metal oxide) under pressure. Since the intervening non-magnetic metal oxide plays the role of a reaction control layer, no reaction takes place between the metal soft magnetic material and the high resistance soft magnetic substance. As a consequence, there is obtained a composite soft magnetic material having a high magnetic permeability and a low core loss.

In the latter embodiment wherein soft magnetic metal particles are previously heat treated, the resulting diffusion layer which serves as a reaction control layer can be a dense and thin layer, which is favorable for magnetic performance.

According to the present invention, the composite soft magnetic material produced as above can be annealed for further improving magnetic permeability, core loss and other factors. The presence of the reaction control layer continues to prevent any reaction between the metal soft magnetic material (e.g., Sendust) and the high resistance soft magnetic substance (e.g., ferrite) during annealing, permitting the respective components to be accorded the benefits of annealing. More particularly, property improvements are accomplished by annealing for the metal soft magnetic material by way of strain removal and for the high resistance soft magnetic substance by way of recovery of its stoichiometric composition such as oxygen content. In the absence of a reaction control layer of non-magnetic metal oxide, annealing would rather lower the desired properties because reaction can take place between the metal soft magnetic material and the high resistance soft magnetic substance.

JP-A 180434/1991 discloses a method for preparing cermet type ferrite comprising the steps of charging a shaping/bonding mold with a mixture of a ferrite powder possessing substantially amono-layer and a metal base magnetic powder, and effecting press molding and discharge/conduction junction substantially at the same tirade by generating intergranular discharge through voltage application, thereby producing a composite body in which particles are directly bound. Unlike the present invention. this publication does not teach the presence of non-magnetic metal oxide between the ferrite and the metal base magnetic material. Then even if the product is sintered, there would result insufficient density and less satisfactory magnetic and other properties.

Also, Kugimiya et al., Powder Metallurgy, 37 (1990), 333 and Kugimiya et al., the Proceedings of the Powder Metallurgy Society 1989 Fall Meeting, 135, reports the manufacture of a metal/dielectric material by atomizing Fe-Si-Al magnetic metal in nitrogen, heat treating the metal particles in air to thereby form a dielectric film of 10 to 500 nm thick uniformly over the surface of particles as a diffusion layer, and hot press sintering a mass of the particles. The resulting metal/dielectric material is described as being increased in density, saturation magnetic flux density, and electric resistance. Unlike the present invention, these reports do not use a high resistance soft magnetic substance or teach the diffusion layer effective as a layer for controlling reaction with high resistance soft magnetic substance. Sintered bodies obtained from magnetic metal particles alone are not satisfactory in the core loss and other properties contemplated herein.

DETAILED DESCRIPTION OF THE INVENTION

Figure 1:
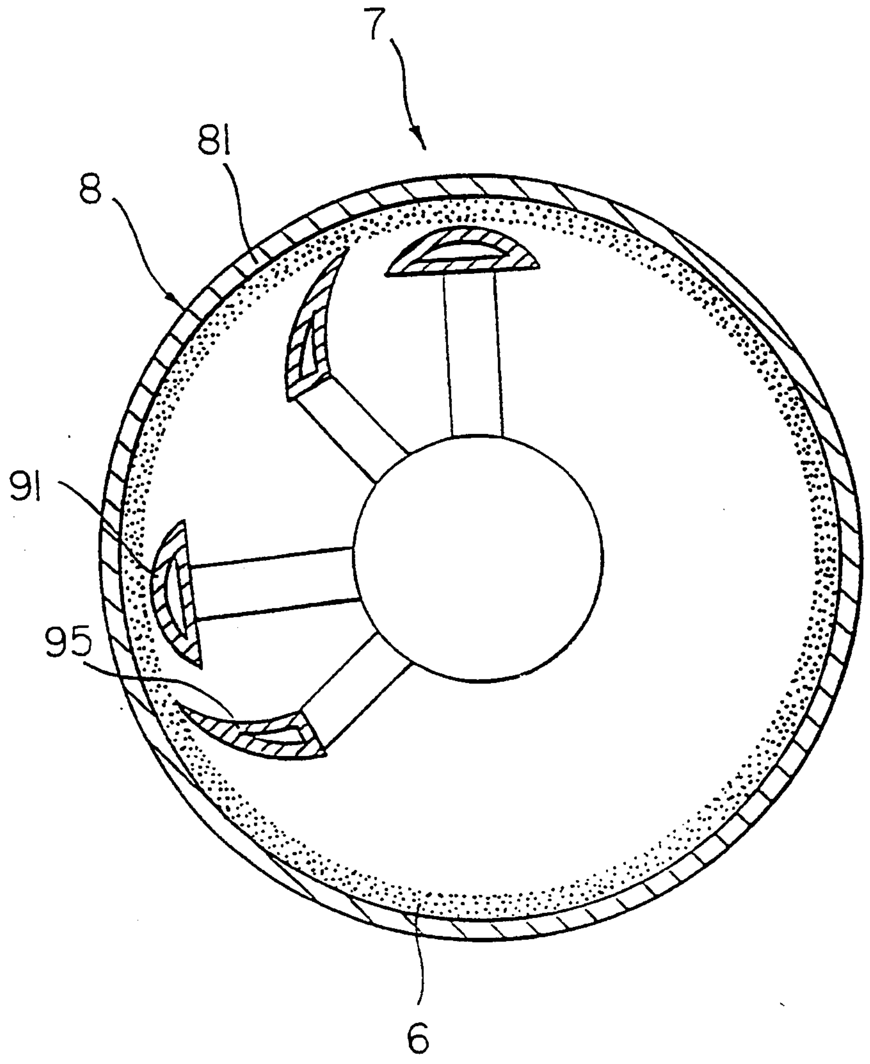
FIG. 1 is a cross-sectional view of one exemplary coating apparatus based on mechano-fusion for use in the manufacture of a composite soft magnetic material according to the present invention.

According to the present invention, a composite soft magnetic material is provided in which a layer of high resistance soft magnetic substance intervenes between soft magnetic metal particles, and a layer of non-magnetic metal oxide intervenes between each soft magnetic metal particle and the high resistance soft magnetic substance layer.

Briefly stated, the composite soft magnetic material is obtained by sintering under pressure a mixture of soft magnetic metal particles and a high resistance soft magnetic substance with a non-magnetic metal oxide intervening therebetween. Preferably, it is produced by (A) previously coating soft magnetic metal particles with a non-magnetic metal oxide or (A') previously heat treating soft magnetic 5 metal particles in an oxygen atmosphere to thereby form a diffusion layer of non-magnetic metal oxide on the particle surface, (B) coating the coated or treated particles with a high resistance soft magnetic substance, and (C) sintering the coated particles under pressure.

The type of metal particles used herein is not particularly limited insofar as they are of soft magnetic metals. Either elemental metals or alloys may be used. Mixtures of a metal and an alloy are also acceptable. The soft magnetic metal is defined as having a coercive force of up to about 0.5 oersted (Oe) in bulk state. Preferred examples of the soft magnetic metal are transition metals and alloys containing at least one transition metal, including Fe-Al-Si alloys such as Sendust, Fe-Al-Si-Ni alloys such as Super Sendust, Fe-Ga-Si alloys such as SOFMAX, Fe-Si alloys, Fe-Ni alloys such as Permalloy and Supermalloy, Fe-Co alloy such as Permendur, silicon steel, $Fe_2B$, $Co_3B$, YFe, $HfFe_2$, $FeBe_2$, $Fe_3Ge$, $Fe_3P$, Fe-Co-P alloys, and Fe-Ni-P alloys. Among others, those alloys having $DO_3$ type grain structure as typified by Sendust and other Fe-Al-Si alloys are accorded more benefits of the intervening non-magnetic metal oxide in that the oxidation of Al into alumina is inhibited, affording better magnetic properties.

As to the remaining magnetic properties, the soft magnetic metal particles preferably have a saturation magnetic flux density Bs of about 7 to 17 kG a coercive force Hc of about 0.002 to 0.4 Oe, and an initial magnetic permeability $\mu i$ of about 10,000 to 100,000 in DC mode, as measured in bulk form.

The use of metals or alloys as mentioned above ensures satisfactory soft magnetic properties, especially high saturation magnetic flux density.

The soft magnetic metal particles used preferably have a mean particle size of about 5 to 100 $\mu$m. Below this range, increased coercivity results in an increased hysteresis loss and core loss, and magnetic permeability becomes of reduced magnitude. Beyond this range, the eddy current loss in metal particles would increase and the magnetic permeability in the high frequency band would greatly lower. It is to be noted that the mean particle size is a 50% particle size $D_{50}$ at which in the histogram of particle size measured by a laser scattering method, the accumulative weight of particles having the smallest to larger size reaches 50% of the total weight.

In one preferred embodiment, soft magnetic metal particles are previously coated with a non-magnetic metal oxide. This coating is effective for restraining reaction of the underlying soft magnetic metal with a high resistance soft magnetic substance, thus avoiding an increase of core loss.

A variety of non-magnetic metal oxides may be used herein insofar as they are effective for the just mentioned purpose, although those metal oxides having an oxide forming free energy of up to −600 kJ/mol at 600° to 1,000° C. are preferred. Examples of the non-magnetic metal oxide include $\alpha$-$Al_2O_3$, $Y_2O_3$, MgO, $ZrO_2$, and CaO, with $\alpha$-$Al_2O_3$ and $Y_2O_3$ being preferred. In the present invention, metalloids such as Si are included in the metal that constitutes the nonmagnetic metal oxide.

The coating of non-magnetic metal oxide is preferably about 0.02 to 1 $\mu$m thick. Too thin coatings are not effective as a reaction control layer whereas too thick coatings would adversely affect magnetic properties.

Soft magnetic metal particles can be coated with magnetic metal oxide by any desired method, for example, mechano-fusion, electroless plating, co-precipitation, organometallic chemical vapor deposition (MO-CVD), sputtering, and evaporation. As the case may be, a sol-gel method using metal alkoxide or the like is useful.

Among these methods, mechano-fusion is preferred because of many advantages including possible control of coating conditions and particle shape, ease of operation, formation of an even homogeneous continuous coating film, and ease of film thickness control. The term mechano-fusion means a technique of applying predetermined mechanical energy, especially mechanical strain stresses to a plurality of different stock particles to give rise to mechanochemical reaction. Exemplary of the apparatus for applying such mechanical strain stresses is a powder processing apparatus as described in Japanese Patent Application Kokai No. 42728/1988 and commercially available as a mechanofusion system from Hosokawa Micron K.K. and a hybridization system from Nara Machine Mfg. K.K.

Referring to FIG. 1, there is illustrated a mechanofusion coating apparatus 7 wherein a casing 8 charged with powder is rotated at a high speed to form a powder layer 6 along the inner peripheral surface 81 thereof and friction shoes 91 and scrapers 95 are rotated relative to the casino 8, thereby causing the friction shoes 91 to apply compression and friction forces to the powder layer 6 on the inner peripheral surface 81 of the casing 8 while the scrapers 95 serve for scraping, dispersion and agitation. The apparatus may be operated at a temperature of about 15 to 70° C. for a mixing time of about 20 to 40 minutes by rotating the casing 8 at about 800 to 2,000 rpm, while the remaining parameters remain as usual. In this regard, the non-magnetic metal oxide particles preferably have a mean particle size of about 0.02 to 1 $\mu$m.

Another preferred embodiment relies on a diffusion coating technique in that soft magnetic metal particles are heat treated in an oxygen atmosphere to thereby form a diffusion layer of non-magnetic metal oxide on the particle surface, The preferred metals used in the diffusion coating technique are alloys containing Al and/or Si among the previously mentioned metals and alloys. Exemplary are Fe-Al-Si alloys such as Sendust and Fe-Al-Si-Ni alloys such as Super Sendust. Like the coating embodiment, those metal oxides having an oxide forming free energy of up to −600 kJ/mol at 600° to 1,000° C. are preferred oxides that constitute the diffusion layer, and the above-mentioned alloys are prone to form such satisfactory oxides as $\alpha$-$Al_2O_3$ and $SiO_2$. Particularly preferred are alloys containing 1 to 20%, more preferably 2 to 15% by weight of Al and/or Si, especially 3 to 7% by weight of Al. Alloys containing Al alone or both Al and Si will form a diffusion layer based $\alpha$-$Al_2O_3$, and alloys containing Si alone will form a diffusion layer based on $SiO_2$. By limiting the content of Al and/or Si to the above-defined range, a diffusion layer effective for the present purpose can be produced.

The diffusion layer is preferably about 3 to 300 nm, more preferably about 10 to 150 nm thick. The diffusion coating technique allows for formation of a thinner diffusion layer which is dense regardless of thinness as compared with the ordinary coating technique. Thinner layers are preferred from the standpoint of magnetic properties, but too thin layers are not effective for the present purpose.

Preferably the diffusion layer contains $\alpha$-$Al_2O_3$ and/or $SiO_2$, especially $\alpha$-$Al_2O_3$. Their preferred content is at least 50% especially at least 80% by weight.

The thickness of the diffusion layer may be estimated from an oxygen gas analysis thereon. Such an estimation is acknowledged by Auger electron spectroscopy (AES), electron spectroscopy for chemical analysis (ESCA), secondary ion mass spectrometry (SIMS), and transmission electron microscope (TEM) observation. The composition of the diffusion layer and the content of $\alpha$-$Al_2O_3$ are determined by elemental analysis, with the composition being identified by X-ray diffraction.

In the diffusion coating technique, the heat treatment is continued at a temperature of about 200° to 1,000° C. especially about 500° to 800° C., for about 1 minute to about 5 hours, especially about 10 to 60 minutes. The heat treatment is usually in air although an oxygen atmosphere containing at least 1% by volume based on the entire gases of oxygen is acceptable.

Next, the soft magnetic metal particles having non-magnetic metal oxide previously coated thereon or a diffusion layer thereof previously formed thereon are coated with a high resistance soft magnetic substance. No particular limit is imposed on the high resistance soft D magnetic substance insofar as it has high resistance and can be improved in soft magnetic properties by sintering. By the term high resistance used herein it is meant that the electric resistivity $\rho$ is about $10^2$ Ω-cm or higher as measured in bulk form. With $\rho$ of less than $10^2$ Ω-cm, an increased eddy current loss would occur in the high frequency band.

Preferred high resistance soft magnetic substances include various soft ferrites and iron nitride. Included in the soft ferrites are, for example, Li ferrite, Mn-Zn ferrite, Mn-Mg ferrite, Ni-Zn ferrite, Cu-Zn ferrite, Ni-Cu-Zn ferrite, Mn-Mg-Cu ferrite, Mg-Zn ferrite, etc. Among them, Ni base ferrites such as Ni-Zn and Ni-Cu-Zn ferrites are preferred because of improved high-frequency response. It is to be noted that the high resistance soft magnetic substances including various soft ferrites and iron nitride are generally used alone, but may be used in admixture of two or more if desired.

The high resistance soft magnetic substance used preferably has a mean particle size of about 0.01 to 2 $\mu$m. Below this range, the powder is expensive to manufacture and difficult to handle and to mold. Beyond this range, it becomes difficult to control the thickness of the coating upon coating metal particles with the substance. As to magnetic properties, the substance preferably has a saturation magnetic flux density Bs of about 2 to 6 kG, a coercive force Hc of about 0.1 to 5 Oe, an initial magnetic permeability $\mu i$ of about 1,000 to 10,000 at a frequency of 100 kHz, and an electric resistivity of $10^2$ to $10^7$ Ω-cm, especially $10^5$ to $10^7$ Ω-cm as measured on a bulk body.

In the practice of the present invention, before a mixture of soft magnetic metal particles and a high resistance soft magnetic substance is sintered under pressure with a non-magnetic metal oxide intervening therebetween, the soft magnetic metal particles having the non-magnetic metal oxide conventionally coated or diffusion coated thereon are preferably coated with the high resistance soft magnetic substance.

The method of coating the soft magnetic metal particles with the high resistance soft magnetic substance is not particularly limited and, for example, mechano-fusion, electroless plating, co-precipitation, MO-CVD or the like may be equally used. Among these methods, mechano-fusion is preferred. The mechanism, apparatus, operating conditions, and benefits of mechano-fusion are as previously described.

The high resistance soft magnetic substance layer covering the surface of the non-magnetic metal oxide overlying the soft magnetic metal particles generally has a thickness of about 0.02 to 10 $\mu$m, preferably about 0.1 to 5 $\mu$m.

Thereafter, the coated particles are sintered under pressure to thereby form an intervening layer of the high resistance soft magnetic substance between and on the surface of oxide-coated soft magnetic metal particles, obtaining a composite soft magnetic material according to the present invention. Pressure sintering may be carried out by plasma activated sintering, hot press (HP), hot isostatic press (HIP) techniques, for example, with the plasma activated sintering and hot press sintering being preferred.

The plasma activated sintering is to place a mass of double coated particles (in which the soft magnetic metal particles are coated with the non-magnetic metal oxide and then with the high resistance soft magnetic substance) in plasma to thereby activate the coated particles prior to sintering.

Figure 2:
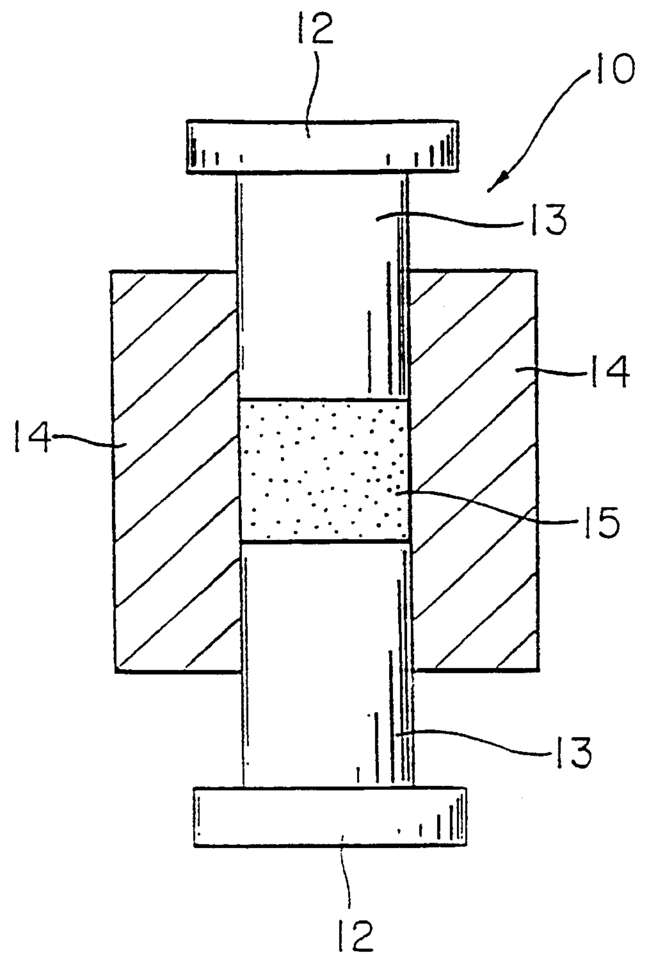
FIG. 2 is a schematic cross-sectional view of one exemplary plasma activated sintering apparatus for use the manufacture of a composite soft magnetic material according to the present invention.

No particular limit is imposed on the plasma creating system and the plasma activated sintering apparatus used. A plasma activated sintering apparatus 10 is illustrated in FIG. 2 as one preferred embodiment.

First, the space defined between punches 13, 13 in a mold 14 of the apparatus 10 is charged with the double coated particles 15. Then the punches 13, 13 are moved toward each other to press the charge 15, electric current flow is supplied between electrodes 12, 12 in vacuum to generate a plasma in the charge, and then continuous current flow is supplied to effect sintering. The plasma creating current flow is generally pulse current having a pulse duration of about $20\times10^{-3}$ to $900\times10^{-3}$ sec.

This mechanism is described in further detail.

When the pulse voltage applied between the electrodes 12 and 12 reaches a predetermined value, dielectric breakdown occurs at the interface between the electrodes and the coated particles and the interface between the coated particles themselves causing electric discharge. At this point, the coated particles are fully cleaned on the surface by bombardment of electrons emitted from the cathode and ions generated at the anode. In addition, spark discharge applies impact pressures to the particles, inducing strains in the particles and enhancing the diffusion rate of atoms. The subsequent continuous current flow generates Joule heat which spreads from points of contact and renders the high resistance soft magnetic substance on the coated particles to be prone to plastic deformation. Since atoms near the contact interfaces have been activated to a mobile state, mere application of a pressure of about 200 to 500 kg/cm$^2$ to the coated particles will bring the particles closer and cause atoms to diffuse. Because of the presence of an electric field, metal ions are also mobile electrically. As a result, the sintering time is reduced enough to enhance the function of the intervening non-magnetic metal oxide for preventing the soft magnetic metal particles from oxidation and the high resistance soft magnetic substance from reduction.

Parameters generally used for such plasma activated sintering are given below.

Press pressure: about 200 to 2,500 kg/cm$^2$
Plasma generating time: about 1 to 3 min.
Plasma atmosphere: $10^{-3}$ to $10^{-5}$ Torr
Maximum sintering temperature: about 600° to 1200° C.
Holding time at maximum temperature: about 1 to 10 min.
Conducting current: about 1,500 to 3,000 amperes It should be understood that the foregoing description is merely for illustrative purposes. The atmosphere may be an inert gas such as Ar or nitrogen gas having a controlled partial pressure of oxygen. An oxygen-containing atmosphere, typically air is acceptable as the case may be. Other parameters may be suitably chosen depending on a particular type of plasma generating system and sintering apparatus.

In the case of the hot press technique, the double coated particles are sintered at a temperature of about 600° to 1,200° C. under a pressure of about 200 to 2,500 kg/cm$^2$. Sintering can be completed by holding at the temperature for about 10 minutes to about 2 hours. The sintering atmosphere may be vacuum, an oxygen-containing atmosphere, typically air, an inert Gas, typically At, or nitrogen gas.

sintering under pressure yields a dense sintered product without incurring undesired reaction. More particularly, during sintering, the high resistance soft magnetic substance (e.g., ferrite) undergoes Grain growth and the metal soft magnetic material (e.g., Sendust) undergoes plastic deformation. These phenomena cooperate to produce a sintered body having a high packing density, namely a relative density of at least 95% of the theory.

In the preferred practice of the present invention, the soft magnetic metal particles which have been coated with the high resistance soft magnetic substance are subject to pressure sintering although it is acceptable to merely mix both types of particles prior to pressure sintering, as the case may be.

The composite soft magnetic material of the present invention is thus obtained as a structure in which a layer of the non-magnetic metal oxide and a layer of the high resistance soft magnetic substance intervene between the soft magnetic metal particles.

Preferably, the intervening layer of the high resistance soft magnetic substance and the soft magnetic metal particles are present at a volume ratio of from about 1:99 to about 30:70. The intervening layer of the non-magnetic metal oxide and the soft magnetic metal particles are present at a volume ratio of from about 0.1:99.9 to about 30:70 in the case of conventional coating and from about 0.12:99.98 to about 1:99 in the case of diffusion coating. It is to be noted that the soft magnetic metal particles in the composite soft magnetic material of the invention have a mean particle size corresponding to that of the source particles, that is, of the order of 5 to 100 μm.

If a non-magnetic substance were used as the intervening layer component instead of the high resistance soft magnetic substance, the resulting composite soft magnetic material would no longer have as improved magnetic properties as the present invention because its magnetic permeability and saturation magnetic flux density are low as compared with the use of the magnetic substance. The fact that the intervening layer has magnetism after sintering can be confirmed, for example, by spin measurement using an electron microscope or by magnetic domain observation by Vitter method.

The composite soft magnetic material of the present invention has the following properties.

Saturation magnetic flux density Bs: about 5 to 15 kG
Coercive force Hc: about 0.05 to 2 Oe
Initial permeability $\mu i$: about 50 to 5,000 at 100 kHz
Electric resistivity $\rho$: about $10^2$ to $10^7$ Ω-cm, especially about $10^5$ to $10^7$ Ω-cm
Core loss: about 350 to 3,000 kW/m$^3$ at 0.1 mT, 100 kHz about 5 to 100 kw/m$^3$ at 0.1 mT, 10 kHz Finally, the sintered material may be subjected to additional heat treatment in an oxygen-containing atmosphere, that is, annealed. Air is most often used as the oxygen-containing atmosphere because of convenient operation although any gas containing at least 1% by volume of oxygen is useful. The annealing temperature is below the sintering temperature, for example, about 400° to 1,000° C., preferably 500° to 800° C. The annealing time ranges from about 10 minutes to about 5 hours, especially from about 15 minutes to about 2 hours. This heat treatment is effective for removing strains from the soft magnetic metal material and compensating for depleted oxygen in the high resistance soft magnetic substance (e.g., ferrite), thus improving the overall properties. Eventually, the composite material will show an initial permeability $\mu i$ of about 50 to 1,000 at 100 kHz and a core loss of about 350 to 2,000 kW/m$^3$ at 0.1 mT, 100 kHz and about 5 to 100 kW/m$^3$ at 0.1 mT, 10 kHz.

The composite soft magnetic material of the present invention is a useful soft magnetic material for manufacturing magnetic cores, especially common mode choke coils for high frequency power sources and high frequency magnetic cores for transformers, as well as various magnetic heads and cores destined for high density CRT.

EXAMPLE

Examples of the present invention are given below by way of illustration.

EXAMPLE 1

The following soft magnetic metal (Sendust) particles, non-magnetic metal oxide, and high resistance soft magnetic substance (ferrite) were furnished.

Soft magnetic metal particles
Composition (wt%): $Fe_{85}Si_{10}Al_5$
Bs: 11 kG
Hc: 0.1 Oe
$\mu i$ (DC): 30,000
mean particle size: 87 μm
Non-magnetic metal oxide
α-alumina
mean particle size: 0.2 μm
High resistance soft magnetic substance
Ni-Zn ferrite (co-precipitated)
Bs: 3 kG
Hc: 2 Oe
$\mu i$ (100 kHz): 2,000
$\rho$: $10^6$ Ω-cm
mean particle size: 0.02 μm The measuring means used were a vibrating sample magnetometer (VSM) for Bs measurement, a B-H tracer for Hc measurement an LCR meter for $\mu i$ measurement and a four probe method for $\rho$ measurement. The values of Bs, Hc, $\mu i$, and $\rho$ are measurements in bulk form, and in the case of high resistance soft magnetic substance, those after sintering.

Using the apparatus shown in FIG. 1, the soft magnetic metal particles were coated on the surface with the non-magnetic metal oxide and further with the high resistance soft magnetic substance in a mechano-fusion manner to produce double coated particles. The weight ratio of soft magnetic metal/metal oxide/high resistance soft magnetic substance was 193:1:6. The mechano-fusion coating was done by compressing and scraping the powder on the inner surface of the rotating casing at 1,500 rpm for a mixing time of 40 minutes in the early stage of non-magnetic metal oxide coating and at 1,500 rpm for a mixing time of 30 minutes in the later stage of high resistance soft magnetic substance coating.

The non-magnetic metal oxide and high resistance soft magnetic substance coating layers had a thickness of 0.2 $\mu$m and 1 $\mu$m, respectively.

Next, using the plasma activated sintering apparatus shown in FIG. 2, plasma activated sintering was effected on the coated particle charge to produce a composite soft magnetic material (designated sample No. 11) according to the present invention.

The plasma creating system and sintering conditions are shown below.

Plasma creating system: pulse current with a pulse duration of 30 msec.
Press pressure: 2,000 kg/cm$^2$
Plasma generating time: 1 min.
Plasma atmosphere: $10^{-3}$ Torr
Maximum sintering temperature: 700° C.
Holding time at maximum temperature: 1 min.
Conducting current: 2,000 amperes
Sintering atmosphere: $5\times10^{-5}$ Torr Sample No. 11 was observed for magnetic domain structure on the surface, finding that the outer intervening layer of high resistance soft magnetic substance had magnetism. The sintered body was of toroidal shape having an outer diameter of 16 mm, an inner diameter of 6 mm, and a thickness of 4 mm.

For comparison purposes, a comparative composite soft magnetic material (designated sample No. 12) was produced by the same procedures as above except that the coating of non-magnetic metal oxide was omitted, that is, only the high resistance soft magnetic substance coating plus plasma activated sintering.

Another composite soft magnetic material (designated sample No. 13) was produced from the same mechano-fusion double coated particles as above, but by hot press sintering. The hot press sintering conditions included a temperature of 800° C., a holding time of 1 hour, and a pressure of 2 t/cm$^2$. The sintering atmosphere was vacuum ($5\times10^{-3}$ Torr.

Further, the soft magnetic metal particles were coated with water glass to a coating thickness of 2 $\mu$m and pressed at 80° C. under a pressure of 5 t/cm$^2$, obtaining a compact (designated sample No. 14).

Sample Nos. 11 to 14 were measured for Bs, Hc, $\rho$, and core loss by the same procedures as above.

Additionally, the sintered bodies of sample Nos. 11 to 13 were annealed for one hour at 650° C. in air. The annealed samples were also measured for core loss (at 100 kHz).

The results are shown in Table 1.

TABLE 1

| Sample No. | Metal oxide (Sintering) | Bs (kG) | Hc (Oe) | $\rho$ (Ω-cm) | Core loss (kW/m$^3$) as sintered 10 kHz | 50 kHz | 100 kHz | Annealed 100 kHz |
|---|---|---|---|---|---|---|---|---|
| 11 | $Al_2O_3$ (plasma activation) | 9 | 1.0 | $10^5$ | 20 | 250 | 800 | 600 |
| 12* | — | 9 | 1.5 | $10^3$ | 80 | 1000 | 3500 | 4500 |
| 13 | $Al_2O_3$ (hot press) | 9 | 1.0 | $10^5$ | 40 | 300 | 1000 | 500 |
| 14* | metal compact | 5 | 2.1 | $10^2$ | 150 | 1500 | 8000 | — |
| 21 | $Al_2O_3$ (plasma activation) | 9 | 1.2 | $10^5$ | 40 | 350 | 980 | 480 |
| 22* | — | 9 | 2.0 | $10^4$ | 80 | 800 | 2100 | 3500 |
| 23 | $Al_2O_3$ (hot press) | 9 | 1.5 | $10^5$ | 45 | 350 | 1100 | 600 |
| 31 | $Al_2O_3$ (plasma activation) | 7.5 | 0.8 | $10^5$ | 20 | 380 | 2000 | 900 |
| 32* | — | 7.5 | 1.8 | $10^4$ | 70 | 1300 | 6000 | 10000 |
| 33 | $Al_2O_3$ (hot press) | 7.5 | 0.8 | $10^5$ | 20 | 350 | 1800 | 800 |
| 41 | $Al_2O_3$ (plasma activation) | 9 | 1.0 | $10^5$ | 40 | 480 | 1300 | 700 |
| 51 | $Al_2O_3$ (plasma activation) | 9 | 2.0 | $10^5$ | 35 | 450 | 1200 | 600 |

The benefits of the present invention are evident the data of Table 1. With regard to the annealed samples, sample Nos. 11 and 13 showed improvements in core loss whereas sample No. 12 became deteriorated in core loss after annealing .

Sample Nos. 11 and 13 had a relative density of higher than 95%.

EXAMPLE 2

The following soft magnetic metal particles, non-magnetic metal oxide, and high resistance soft magnetic substance were furnished.

Soft magnetic metal particles
Composition (wt%): $Fe_{85}Si_{10}Al_5$
Bs: 11 kG
Hc: 0.1 Oe
$\mu i$ (DC): 30,000
mean particle size: 87 $\mu$m
Non-magnetic metal oxide
$\alpha$-alumina
mean particle size: 0.2 $\mu$m
High resistance soft magnetic substance
Mg-Zn ferrite (co-precipitated)
Bs: 2.0 kG
Hc: 1.0 Oe
$\mu i$ (100 kHz): 1,500
$\rho$: $10^6$ Ω-cm
mean particle size: 0.04 $\mu$m As in Example 1, the soft magnetic metal particles were coated on the surface with the non-magnetic metal oxide and further with the high resistance soft magnetic substance in a mechano-fusion manner to produce double coated particles. The weight ratio of soft magnetic metal/metal oxide/high resistance soft magnetic substance was 193:1:6. The mechano-fusion coating was done by compressing and scraping the powder on the inner surface of the rotating casing at 1,500 rpm for a mixing time of 40 minutes in the early stage of non-magnetic metal oxide coating and at 1,500 rpm for a mixing time of 30 minutes in the later stage of high resistance soft magnetic substance coating.

Next, using the plasma activated sintering apparatus shown in FIG. 2, plasma activated sintering was effected on the coated particle charge to produce a composite soft magnetic material (designated sample No. 21) according to the present invention.

The plasma creating system and sintering conditions are shown below.

Plasma creating system: pulse current with a pulse duration of 30 msec.
Press pressure: 2,000 kg/cm$^2$
Plasma generating time: 1 min.
Plasma atmosphere: $10^{-3}$ Torr
Maximum sintering temperature: 700° C.
Holding time at maximum temperature: 1 min.
Conducting current: 2,000 amperes
Sintering atmosphere: $5\times10^{-5}$ Torr Sample No. 11 was observed for magnetic domain structure on the surface, finding that the outer intervening layer of high resistance soft magnetic substance had magnetism.

For comparison purposes, a comparative composite soft magnetic material (designated sample No. 22) was produced by the same procedures as above except that the coating of non-magnetic metal oxide was omitted.

Another composite soft magnetic material (designated sample No. 23) was produced from the same mechano-fusion double coated particles as above, but by hot press sintering. The hot press sintering conditions included a temperature of 800° C., a holding time of 1 hour, a pressure of 2 t/cm$^2$, a $5\times10^{-3}$ Torr.

Sample Nos. 21 to 23 were measured for Bs, Hc, $\rho$, and core loss by the same procedures as in Example 1. Sample Nos. 21 and 23 had a relative density of higher than 95%.

The results are also shown in Table 1.

EXAMPLE 3

A composite soft magnetic material (sample No. 31) was prepared from the following components by mechano-fusion coating and plasma activated sintering as in Example 1.

Soft magnetic metal particles
Composition (wt %): $Fe_{15.5}Ni_{79}Mo_5Mn_{0.5}$
Bs: 8 kG
Hc: 0.005 Oe
$\mu$i (DC): 80,000
mean particle size: 30 $\mu$m
Non-magnetic metal oxide
$\alpha$-alumina
mean particle size: 0.2 $\mu$m
High resistance soft magnetic substance
Ni-Zn ferrite
Bs: 3 kG
Hc: 1 Oe
$\mu$i (100 kHz): 2,000
$\rho$: $10^6$ $\Omega$-cm
mean particle size: 0.05 $\mu$m
Plasma activated sintering
Plasma creating system: pulse current with a pulse duration of 30 msec.
Press pressure: 2,000 kg/cm$^2$
Plasma generating time: 1 min.
Maximum sintering temperature: 700° C.
Holding time at maximum temperature: 1 min.
Conducting current: 2,000 amperes
Sintering atmosphere: air For comparison purposes, a comparative composite soft magnetic material (designated sample No. 32) was produced by the same procedures as above except that the coating of non-magnetic metal oxide was omitted.

Another composite soft magnetic material (designated sample No. 33) was produced from the same mechano-fusion double coated particles as above, but by hot press sintering. The hot press sintering conditions included a temperature of 800° C., a holding time of 1 hour, a pressure of 2 t/cm$^2$, and a vacuum of $5\times10^{-3}$ Torr.

Sample Nos. 31 to 33 were measured for Bs, Hc, $\rho$, and core loss by the same procedures as in Example 1. Sample Nos. 31 and 33 had a relative density of higher than 95%.

The results are also shown in Table 1.

EXAMPLE 4

Sample No. 41 was prepared by the same procedure as Example 1 except that the non-magnetic metal oxide was changed from $\alpha$-alumina to $Y_2O_3$ having a mean particle size of 0.2 $\mu$m. Sample No. 41 had a relative density of higher than 95%. The results of measurement are also shown in Table 1.

EXAMPLE 5

Sample No. 51 was prepared by the same procedure as in Example 1 except that soft magnetic metal particles of the same composition, but having a mean particle size of 28.5 $\mu$m were used. Sample No. 51 had a relative density of higher than 95%. The results of measurement are also shown in Table 1.

A number of samples were prepared from different types of soft magnetic metal and high resistance soft magnetic substance, obtaining equivalent results.

EXAMPLE 6

Particles of the same soft magnetic metal (Sendust) as in Example 1 were heat treated in air under the varying conditions reported in Table 2 for diffusion coating, forming a diffusion layer. The soft magnetic metal particles (two lots) had a mean particle size of 61 and 28 pm as reported in Table 2.

The thickness of the diffusion layer was estimated from an oxygen content obtained from oxygen gas analysis and reported in Table 2. This thickness estimation was supported by AES, ESCA, and SIMS. From the results of elemental analysis and X-ray diffraction, the diffusion layers were found to have an $\alpha$-$Al_2O_3$ content of about 80% by weight.

Using an apparatus as shown in FIG. 1, the diffusion coated soft magnetic metal particles were coated on the surface with the same high resistance soft magnetic substance (Ni-Zn ferrite) as in Example 1 in a mechano-fusion manner to produce coated particles. The mechano-fusion coating was done by compressing and scraping the powder on the inner surface of the rotating casing at 1,500 rpm for a mixing time of 30 minutes. The weight ratio of diffusion coated soft magnetic metal/high resistance soft magnetic substance was 98:2. The coating layer of high resistance soft magnetic substance was 0.5 $\mu$m thick.

Sintered bodies were produced from the coated particles by hot press sintering or plasma activated sintering as reported in Table 2. The sintered bodies were of the same toroidal shape as in Example 1. The sintered bodies were further heat treated or annealed for one hour at 650° C. in air, obtaining sample Nos. 61 to 66.

The hot press sintering conditions included a temperature of 800° C., a holding time of 1 hour, a pressure of 2 $t/cm^2$, and a vacuum of $5\times10^{-3}$ Torr. The plasma activated sintering conditions were the same as in Example 1.

Sample Nos. 61 to 66 were measured for Bs, Hc, ρ, and core loss by the same procedures as in Example 1. It is to be noted that the core loss (at 100 kHz) was measured both before and after annealing. Each sample was observed for magnetic domain structure on the surface, finding that the high resistance soft magnetic substance layer had magnetism. All the samples had a relative density of higher than 95%.

The results are also shown in Table 2.

TABLE 2

| Sample No. | Soft magnetic metal particles: Particle size | Heat treatment: Temp. | Heat treatment: Time | Diffusion layer: $O_2$ content (ppm) | Diffusion layer: Thickness (nm) | Sintering | Bs (kG) | Hc (Oe) | ρ (Ω · cm) | Core loss (kW/m³): 10 kHz | Core loss (kW/m³): 50 kHz | Core loss (kW/m³): 100 kHz | 100 kHz (Before annealing) |
|---|---|---|---|---|---|---|---|---|---|---|---|---|---|
| 61 | 61 μm | 500° C. | 20 min | 280 | 30 | Hot press | 9 | 0.7 | $10^5$ | 40 | 320 | 900 | 1600 |
| 62 | 61 μm | 600° C. | 15 min | 560 | 60 | Hot press | 9 | 0.7 | $10^5$ | 80 | 750 | 2000 | 3000 |
| 63 | 61 μm | 600° C. | 15 min | 560 | 60 | Plasma activation | 9 | 0.8 | $10^5$ | 60 | 400 | 1000 | 1800 |
| 64 | 61 μm | 750° C. | 10 min | 1110 | 120 | Hot press | 9 | 0.8 | $10^5$ | 25 | 200 | 500 | 2400 |
| 65 | 28 μm | 750° C. | 10 min | 1410 | 65 | Hot press | 9 | 1.0 | $10^5$ | 20 | 180 | 430 | 1000 |
| 66 | 28 μm | 750° C. | 60 min | 1640 | 75 | Hot press | 9 | 1.0 | $10^5$ | 15 | 170 | 350 | 1100 |

The effectiveness of the invention is evident from Table 2.

Figure 3:
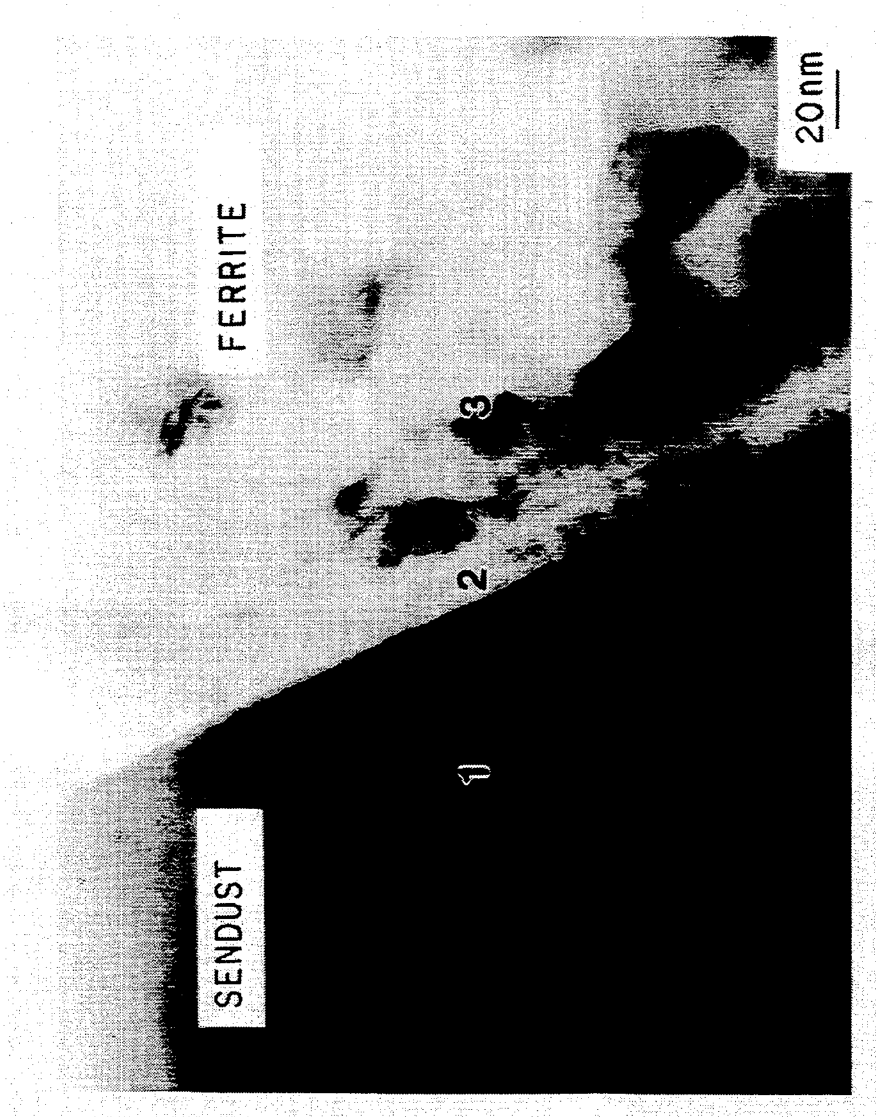
FIG. 3 is a TEM photomicrograph showing a section of composite soft magnetic material according to the present invention.

Sample No. 64 was sectioned and observed under a transmission electron microscope (TEM), with the photomicrograph shown as FIG. 3. It is seen that a diffusion layer 2 intervenes between Sendust 1 and ferrite 3, and the diffusion layer 2 and ferrite 3 are dense layers.

There has been described a composite soft magnetic material in which a non-magnetic metal oxide intervenes between a soft magnetic metal and a high resistance soft magnetic substance and which possesses both the high saturation magnetic flux density and high magnetic permeability characteristic of the soft magnetic metal and the high electric resistivity characteristic of the high resistance soft magnetic substance. The composite material thus shows improved soft magnetic properties suitable as the soft magnetic material for magnetic cores and a significantly reduced eddy current loss in the high frequency band.

Although the present invention has been described in connection with specific examples and embodiments, it will be understood by those skilled in the art involved that the present invention is capable of modification without departing from its spirit and scope as represented by the appended claims.

We claim:

1. A composite soft magnetic material comprising soft magnetic metal particles having a mean particle diameter of 5–100 μm and a coercive force of up to about 0.5 Oe as measured in bulk form, a layer of high resistance soft magnetic substance having an electric resistivity of about $10^2$ Ω-cm or higher intervening between the particles, and a layer of non-magnetic metal oxide intervening between each soft magnetic metal particle and the high resistance soft magnetic substance layer;

wherein said material has a core loss of about 350–3,000 $kW/m^3$ at 0.1 mT, 100 kHz and about 5–100 $kW/m^3$ at 0.1 mT, 10 kHz.

2. The composite soft magnetic material of claim 1 which is obtained by sintering under pressure said soft magnetic metal particles and said high resistance soft magnetic substance with said non-magnetic metal oxide intervening therebetween.

3. The composite soft magnetic material of claim 2 which is obtained by coating the soft magnetic metal particles with the non-magnetic metal oxide and further with the high resistance soft magnetic substance, and sintering the coated particles under pressure.

4. The composite soft magnetic material of claim 3 wherein the step of coating the particles with the high resistance soft magnetic substance is carried out by a mechano-fusion process including applying mechanical energy to the particles.

5. The composite soft magnetic material of claim 3 wherein the non-magnetic metal oxide coating is 0.02 to 1 μm thick.

6. The composite soft magnetic material of claim 2 which is obtained by heat treating the soft magnetic metal particles in an oxygen atmosphere, thereby forming a diffusion layer of non-magnetic metal oxide on the particle surface, coating the particles with the high resistance soft magnetic substance, and sintering the coated particles under pressure.

7. The composite soft magnetic material of claim 6 wherein the soft magnetic metal particles contain at least one member of Al and Si.

8. The composite soft magnetic material of claim 6 wherein the non-magnetic metal oxide diffusion layer is 3 to 300 nm thick.

9. The composite soft magnetic material of claim 6 wherein the non-magnetic metal oxide is at least one oxide selected from the group consisting of Al and Si.

10. The composite soft magnetic material of claim 3 or 6 wherein the high resistance soft magnetic substance coating is 0.02 to 10 μm thick.

11. The composite soft magnetic material of claim 6 wherein the step of coating the particles with the high resistance soft magnetic substance is carried out by a mechano-fusion process including applying mechanical energy to the particles.

12. The composite soft magnetic material of claim 2, 3 or 6 wherein the sintering step is hot press sintering or plasma activated sintering.

13. The composite soft magnetic material of claim 2, 3 or 6 wherein the sintering under pressure is followed by heat treatment in an oxygen atmosphere.

14. The composite soft magnetic material of claim 1, wherein said high resistance soft magnetic substance has a mean particle size of about 0.01–2 μm.

15. A composite soft magnetic material comprising soft magnetic metal particles having a mean particle diameter of 5–100 μm and a coercive force of up to about 0.5 Oe as measured in bulk form, a layer of high resistance soft magnetic substance having an electric resistivity of about $10^2$ Ω-cm or higher and a mean particle size of about 0.01–2 μm, and a 0.02–1 μm thick layer of non-magnetic metal oxide intervening between each soft magnetic particle and said high resistance soft magnetic substance layer;

wherein said material has a core loss of about 350–3,000 kW/m³ at 0.1 mT, 100 kHz and about 5–100 kW/m³ at 0.1 mT, 10 kHz.

16. A composite soft magnetic material comprising soft magnetic metal particles having a mean particle diameter of 5–100 μm and a coercive force of up to about 0.5 Oe as measured in bulk form, a layer of high resistance soft magnetic substance having an electric resistivity of about $10^2$ Ω-cm or higher and a mean particle size of abut 0.01–2 μm, and a 3 to 300 nm thick layer of non-magnetic metal oxide formed by diffusion intervening between each soft magnetic particles and said high resistance soft magnetic substance layer;

wherein said material has a core loss of about 350–3,000 kW/$m^3$ at 0.1 mT, 100 kHz and about 5–100 kW/$m^3$ at 0.1 mT, 10 kHz wherein said composite material is obtained by heat treating said soft magnetic metal particles in an oxygen atmosphere, thereby forming a diffusion layer of non-magnetic metal oxide on said particle surface, coating said particles with said high resistance soft magnetic substance and sintering said coated particles under pressure.

* * * * *